United States Patent [19]

Nafisi-Movaghar

[11] Patent Number: 4,963,376

[45] Date of Patent: Oct. 16, 1990

[54] FOOD COATING COMPOSITIONS AND METHODS FOR THEIR USE IN MICROWAVE COOKING

[75] Inventor: Karim Nafisi-Movaghar, Walnut Creek, Calif.

[73] Assignee: Nabisco Brands, Inc., East Hanover, N.J.

[21] Appl. No.: 136,450

[22] Filed: Dec. 21, 1987

Related U.S. Application Data

[63] Continuation of Ser. No. 913,107, Sep. 29, 1986, abandoned.

[51] Int. Cl.$^5$ .............................................. A21D 6/00
[52] U.S. Cl. ................................... 426/243; 426/289; 426/296; 426/307; 426/604; 426/609; 426/613; 426/652
[58] Field of Search ............... 426/289, 296, 307, 604, 426/613, 609, 652

[56] References Cited

U.S. PATENT DOCUMENTS

| | | | |
|---|---|---|---|
| 3,220,850 | 11/1965 | Kirk | 426/243 |
| 3,236,654 | 2/1966 | Lipka et al. | 426/289 |
| 4,109,020 | 8/1978 | Gorfien et al. | 426/241 |
| 4,181,744 | 1/1980 | Buck | 426/233 |
| 4,199,603 | 4/1980 | Sortwell | 426/296 |
| 4,252,832 | 2/1981 | Moody | 426/241 |
| 4,283,425 | 8/1981 | Yuan et al. | 426/102 |
| 4,342,788 | 8/1982 | Clatfelter | 426/243 |
| 4,396,817 | 8/1983 | Eck et al. | 426/243 |
| 4,448,791 | 5/1984 | Fulde et al. | 426/94 |
| 4,518,618 | 5/1985 | Hsia et al. | 426/262 |
| 4,518,620 | 5/1985 | Monagle et al. | 426/296 |
| 4,529,607 | 7/1985 | Lenchin et al. | 426/94 |
| 4,595,597 | 6/1986 | Lenchin et al. | 426/555 |
| 4,640,837 | 2/1987 | Coleman et al. | 426/289 |

FOREIGN PATENT DOCUMENTS

2747213 4/1979 Fed. Rep. of Germany .
72-16178 8/1985 Japan .
2111815 7/1983 United Kingdom .

OTHER PUBLICATIONS

Capson et al. "Browning Methods in Microwave Cooking", *Agriculture and Food Chemistry* (May 1955), pp. 424–427.

"Browning Agents Find Niche in Microwave Cooking Market", Food Product Development (Jul. 1979) pp. 34–35.

*Primary Examiner*—Robert J. Warden
*Assistant Examiner*—Timothy M. McMahon

[57] ABSTRACT

Food coating compositions, e.g., sauces, are disclosed which impart desirable brown color and crisp texture to the surface of microwave-cooked foods. These sauces comprise a substantially water-immiscible liquid having dispersed therein effective amounts of a coagulant, and foodstuff which is grindable and exhibits crispness when substantially dehydrated and which has a low affinity for said water-immiscible liquid.

36 Claims, No Drawings

FOOD COATING COMPOSITIONS AND METHODS FOR THEIR USE IN MICROWAVE COOKING

This application is continuation of application Ser. No. 913,107, filed 9/29/86 now abandoned.

This invention relates to microwave cooking compositions and methods for their use in imparting brown color and crispness to food cooked in a microwave oven. More specifically, the invention relates to sauces for coating chicken, turkey, cornish hen and the like, prior to cooking by microwave radiation.

BACKGROUND OF THE INVENTION

Microwave cooking has become popular as an alternative to conventional thermal cooking methods which employ external heat sources. Cooking by microwave radiation involves the absorption of microwave energy directed at, and absorbed by, food which is being cooked. The energy imparted by the absorbed radiation causes molecular excitation that results in heating without an external heat source. Because much of the microwave radiation penetrates the surface of cooking foods and is absorbed beneath the surface, there is less disparity between the surface temperature and core temperatures of foods during microwave cooking than during thermal cooking where the food core is heated by heat transfer only. Thus, more uniform cooking results from microwave cooking.

Microwave cooking tends to progress at a much faster rate than thermal cooking. Because most microwave radiation is absorbed by the cooking foods, and because little heat is imparted to the atmosphere surrounding the foods, microwave cooking is more energy efficient than thermal cooking which heats a larger area and also heats materials other than the food to be cooked.

While the foregoing characteristics of microwave cooking are generally advantageous, some desirable characteristics of thermal heating are not easily duplicated. In particular, among the desirable characteristics imparted by thermal cooking which consumers have come to expect of cooked products are the characteristics of surface browning and crisping. It is believed that the relatively high surface temperatures and long cooking time of thermally cooked foods enhance the browning and crisping of food surfaces. Microwave cooking, in spite of its many advantages often involves insufficient cooking times and surface temperatures to achieve a degree of crisping and browning comparable to thermal cooking.

A number of solutions have been proposed for producing microwave-cooked products having desirable surface crispness and color which approximates the crispness and color achievable during thermal cooking. For instance, sauces which include sugars and amino acids have been used to coat chicken, chops, and the like for the purpose of achieving reactions which impart brown color. These browning sauces do not necessarily address the crispness problem. Moreover, moisture escaping from foods during cooking may inhibit the browning and may wash away and remove coating sauces. Spattering may also remove sauce from the food surface leaving inadequate amounts to achieve the desired browning and crisping.

Two-step processes have been proposed which involve roasting foods in hot fat to impart the desired crust and exposing the foods to microwave radiation for completing the cooking. However, such a two-step procedure eliminates the convenience which is a principle object of microwave cooking in the first place. That is, the additional cooking step diminishes the overall efficiency of the cooking process.

Other techniques previously proposed for enhancing crisping and browning in microwave cooking include modifications in the microwave heating apparatus to alter the environment around foods as they are cooked by, for instance, adjusting humidity to a predetermined level.

In U.S. Pat. No. 4,518,618, coating sauces are disclosed having combinations of certain salts which are said to increase surface absorption of microwaves and to increase surface temperature during cooking. Sauces containing these salts and other basic materials such as bread crumbs, maltodextrins and bran flakes are said to increase the crispness and brownness of microwave-cooked products. The patent does not address the problem of reduced sauce effectiveness which may be caused by spattering or by moisture escaping from the foods being cooked. Moreover the presence of a high salt concentration is undesirable for most food products. Indeed many health-conscious individuals prefer to avoid large quantities of salt in their diets.

Thus there remains a need for a moisture-resistant, spatter-resistant composition for imparting desirable brown color and crisp texture to the surface of microwave-cooked foods without elaborate modifications to the cooking apparatus, without adding multiple cooking steps, and without adding compounds which adversely affect palatability or desirability of foods to consumers.

It is an object of the instant invention to provide microwave cooking sauces capable of imparting desirably brown color and crisp texture to the surface of foods coated with said sauces and cooked by microwave.

It is another object of the invention to provide sauces which adhere well to foods on which they are coated and which resist spattering throughout the cooking process.

It is another object of the invention to provide sauces which help seal in the natural moisture of cooked meats and other food products.

It is another object of the instant invention to provide microwave cooking sauces which are effective in imparting crispness and brownness to even those foods which emit substantial amounts of water during cooking.

Other objects and advantages of the invention will become apparent from a thorough reading of the instant specification.

SUMMARY OF THE INVENTION

The present invention provides a food coating sauce for imparting brown color and crisp texture to the surface of microwave-cooked food products, said sauce comprising a substantially water-immiscible liquid including an effective amount of a coagulant and an amount of a crisping agent having low affinity for the water-immiscible liquid effective to impart organoleptically perceptible crispness to the surface of foods which have been coated with said sauce and cooked with microwave radiation.

The sauce of the invention is believed to aid the retention of moisture by foods during microwave cooking, to resist being washed away or rendered less effective by the moisture of the cooked food and is also spatter-resistant. In certain preferred embodiments, a browning agent is added for the purpose of enhancing brown color during cooking.

Without intending to be bound by theory, applicant believes that the crisping agent is protected by the surrounding water-immiscible liquid, and in some cases by the coagulant, from being rendered ineffectual by moisture from the cooked product. Because the crisping agent has little affinity for the water-immiscible fluid, the fluid is substantially unabsorbed by the crisping agent which retains its crisp character and is not rendered "soggy" by absorption of surrounding fluids. The coagulant is believed to aid in providing a brown crisp surface to the microwave-cooked food products and to aid the retention of water by the food product. Moreover, the coagulant is believed to enhance the ability of the sauce to cling to the surface of food during cooking and to enhance its resistance to spattering.

DETAILED DESCRIPTION OF CERTAIN PREFERRED EMBODIMENTS

In preferred embodiments of the instant invention, an edible food coating composition is prepared by providing a water-immiscible liquid having an effective amount of a maltodextrin browning agent dispersed therein, a crisping agent having low affinity for the liquid, and a coagulant. The ingredients of the sauce may be added to the liquid with constant stirring, and the mixture is preferably blended to uniformity. Effective amounts of seasoning and flavoring may then be added. Free water is substantially avoided although some ingredients may contain some water. The resulting sauce may be applied to the surface of microwave-cookable foods by known means such as spreading or brushing the sauce onto the food surface or by dipping food into the sauce prior to cooking.

The water-immiscible liquid may be comprised of any substantially water-immiscible liquid which is acceptable for human ingestion and which does not substantially soften the crisping agent which is to be intermixed therewith. Useful liquids include common cooking oils and fats such as animal and vegetable oils, shortenings, saturated and unsaturated fats, and the like. Preferred liquids include margarine, butter, CRISCO TM shortening (Available from Proctor & Gamble Company, U.S.A.), cottonseed oil, palm oil, WESSON TM oil (Available from Hunt - Wesson Company, U.S.A.) sesame seed oil, sunflower seed oil, fish oils and combinations of the foregoing. The liquid is preferably present in a concentration above about 25%, such as about 30% to about 50%. Viscosity of the sauce may be adjusted to desired levels by varying the liquid type, concentration and mix. In certain embodiments the water-immiscible liquid is present in low concentrations such that the composition is lightly oiled and has a plastic consistency. The water-immiscible liquid may be a combination of oil and shortening, preferably in a ratio of about 3:1 to about 5:1.

Browning agents useful in the composition of the invention include a variety of substances which alone or in combination with other substances tend to produce a brown color in response to microwave radiation and/or to the heat generated thereby. Carbohydrates are useful as browning agents. It is desirable to select substances which do not unfavorably alter the taste of the sauce or the food product with which the sauce is used. In this regard, sugars are less desirable than long-chain maltodextrins and the like. Browning agents are preferably present in a concentration of about 3% to about 8%, by weight of the sauce. Desirable brown color may be present in the sauce prior to cooking. Preferably the water-immiscible liquid, coagulant, crisping agent, and/or other ingredients contribute to the brown color of the sauce both before and after cooking.

The crisping agent may be comprised of any composition having low affinity for the water-immiscible liquid which is acceptable for human ingestion and which is capable of imparting an organoleptically perceptible crispness to the surface of microwave-cooked foods. Preferred crisping agents include bread crumbs, cornflakes, and other foodstuffs which are grindable and which exhibit crispness when substantially dehydrated. The crisping agent is preferably a toasted, substantially dehydrated agent capable of imparting brown color even prior to being included in the coating compositions of the invention. Crisping agents are preferably present in a concentration above about 20%, such as about 20% to about 50%, by weight of the sauce.

Preferred coagulants include powdered egg whites, and are preferably present in a concentration above about 10%, such as about 10% to about 25%, by weight of the sauce.

The sauce may be flavored and seasoned with a wide variety of flavorings and seasonings such as onion, garlic, cheese, salt, chives, peppers, parsley, white pepper, thyme, rosemary and the like. Preservatives may be added if desired.

The invention is further illustrated by the examples which follow.

EXAMPLE 1

A microwave sauce is prepared batchwise by introducing a vegetable oil to a vat having a stirring means. A powdered egg white is introduced with constant stirring, followed by maltodextrin, onion powder, garlic powder, rosemary and bread crumbs. The mixture is stirred until it reaches a substantially uniform mixture. The resulting mixture is then ready for use as a microwave cooking sauce which may be applied to the surface of foods prior to microwave cooking and which, upon cooking, imparts to the surface of said foods visually perceptible brown color and organoleptically perceptible crisp texture.

EXAMPLES 2-5

Microwave sauces were prepared from ingredients and in the concentrations (by weight percent) shown below. The observed texture and viscosity of the final sauce were as indicated below.

| Ingredients | Example 2 | Example 3 | Example 4 | Example 5 |
|---|---|---|---|---|
| Crisco (TM) Vegetable Shortening | 20.00 | 30.00 | 10.00 | 10.00 |
| Crisco (TM) Vegetable Oil | 20.00 | 20.00 | 30.00 | 20.00 |
| Bread Crumbs | 27.29 | 22.29 | 27.29 | 35.29 |
| Egg white solids | 20.00 | 15.00 | 20.00 | 22.00 |
| Cream of Rice | 4.29 | 4.29 | 4.29 | 4.29 |

-continued

| Ingredients | Example 2 | Example 3 | Example 4 | Example 5 |
|---|---|---|---|---|
| Milled Rice | — | — | — | — |
| Maltodextrin | 4.29 | 4.29 | 4.29 | 4.29 |
| Salt | 2.23 | 2.23 | 2.23 | 2.23 |
| Garlic powder | 0.68 | 0.68 | 0.68 | 0.68 |
| Paprika | 0.48 | 0.48 | 0.48 | 0.48 |
| Chives, (freeze-dried) | 0.27 | 0.27 | 0.27 | 0.27 |
| Parsley, dehy. | 0.21 | 0.21 | 0.21 | 0.21 |
| White pepper, grd. | 0.09 | 0.09 | 0.09 | 0.09 |
| Thyme, grd. | 0.09 | 0.09 | 0.09 | 0.09 |
| Rosemary, grd. | 0.08 | 0.08 | 0.08 | 0.08 |
| TOTAL | 100.00 | 100.00 | 100.00 | 100.00 |
| Texture of Final Sauces | Substantially non-flowing (plastic texture) | Substantially non-flowing (plastic texture) | Free flowing (sauce-like) | Substantially non-flowing (cobbler-consistency) |

EXAMPLES 6-9

Microwave sauces were prepared from the ingredients and in the concentrations (by weight percent) shown below. After preparation, the sauces were applied to chicken parts and were cooked in a microwave oven for a time sufficient to cook the chicken. Crispness and moisture retention by the chicken were observed by sight, touch and organoleptically, with the results as shown below.

| Ingredients | Example 6 | Example 7 | Example 8 | Example 9 |
|---|---|---|---|---|
| Crisco (TM) Shortening | — | — | 40.00 | 40.00 |
| Vegetable Oil | 23.00 | 23.00 | — | — |
| Bread Crumbs, | 52.06 | 30.86 | 34.29 | 27.29 |
| Egg White Solids | 12.87 | 24.73 | 13.00 | 20.00 |
| Cream of Rice | 4.29 | 8.24 | 4.29 | 4.29 |
| Maltodextrin | 4.29 | 8.24 | 4.29 | 4.29 |
| Salt | 2.23 | 2.50 | 2.23 | 2.23 |
| Garlic Powder | 0.45 | 0.86 | 0.68 | 0.68 |
| Paprika | 0.32 | 0.61 | 0.48 | 0.48 |
| Chives, freeze-dried | 0.18 | 0.35 | 0.27 | 0.27 |
| Parsley, dehy. | 0.14 | 0.27 | 0.21 | 0.21 |
| White pepper, grd. | 0.06 | 0.12 | 0.09 | 0.09 |
| Thyme, grd. | 0.06 | 0.12 | 0.09 | 0.09 |
| Rosemary, grd. | 0.05 | 0.10 | 0.08 | 0.08 |
| TOTAL | 100.00 | 100.00 | 100.00 | 100.00 |
| Microwave Cooked Chicken characteristics | dry inside; not crisp on surface | dry inside; not crisp on surface | crisp | crisp |

For Example 6 and 7, all dry ingredients were mixed together, then oil was slowly added and blended to consistency. The same procedure was followed for Examples 8 and 9, except the shortening was melted prior to adding.

EXAMPLE 10

A food coating composition is prepared by mixing the ingredients set forth in below in the proportions shown:

| Ingredient | Weight Percent |
|---|---|
| Vegetable Oil | 30.00 |
| Breadcrumbs | 39.57 |
| Egg White Solids | 12.87 |
| Cream of Rice | 4.29 |
| Maltodextrin | 4.29 |
| Salt | 2.23 |
| Sugar | 1.04 |
| Garlic Powder | 1.03 |
| Onion Powder | 0.57 |
| Paprika | 0.40 |
| Cayenne Pepper | 0.34 |
| Black Pepper | 0.40 |
| Oregano | 0.14 |
| Cumin | 0.14 |
| Grill Flavor | 0.11 |
| Dehydrated Onions | 1.15 |
| Monosodium Glutamate | 0.86 |
| Chicken Flavor | 0.57 |
| TOTAL | 100.00 |

The foregoing description of the invention and examples are set forth by way of illustration only and not by way of limitation. The specific terms and descriptions used herein are not intended to exclude the wide variety of alternatives which those of skill in the art will readily recognize as available for the practice of the instant invention as defined by the following claims.

What is claimed is:

1. A food-coating composition for imparting brown color and crisp texture to the surface of microwave-cooked food products which is not pre-cooked before it is applied to food products, comprising an edible substantially water-immiscible liquid including an amount of a coagulant effective to retard spattering of the composition during microwave cooking, and a crisping agent, which does not substantially absorb the water-immiscible liquid, in an amount effective to impart organoleptically perceptible crispness to the surface of foods which have been coated with said composition and cooked with microwave radiation, wherein the water-immiscible liquid is present in amount which is effective to completely surround the crisping agent when the food-coating composition is coated onto the surface of foods.

2. The composition according to claim 1 wherein said crisping agent comprises a foodstuff which exhibits grindability and crispness when substantially dehydrated.

3. The composition according to claim 1 wherein said crisping agent comprises cornflakes or bread crumbs.

4. The composition according to claim 1 wherein said composition further comprises a browning agent in an amount which is effective to impart a brown color to the surface of foods which have been coated with said composition and cooked with microwave radiation.

5. The composition according to claim 4 wherein said browning agent comprises a carbohydrate.

6. The composition according to claim 4 wherein said browning agent comprises a maltodextrin.

7. The composition according to claim 1 wherein said coagulant is egg white powder.

8. The composition according to claim 1 wherein said substantially water-immiscible liquid comprises an animal or vegetable oil or fat.

9. The composition according to claim 1 wherein said substantially water-immiscible liquid comprises a fluid selected form the group consisting of margarine, butter, shortening, cottonseed oil, palm oil, sesame seed oil, sunflower seed oil and fish oil.

10. The composition according to claim 1 wherein said food coating composition comprises, by weight of the composition, at least about 25% of said water-immiscible liquid, at least about 10% of said coagulant, and at least about 20% of said crisping agent.

11. The composition according to claim 10 wherein said liquid comprises animal or vegetable oil; said coagulant comprises egg white or egg white powder; said browning agent is a carbohydrate; and said crisping agent comprises a foodstuff which is grindable and exhibits crispness when substantially dehydrated.

12. A food coating composition for imparting brown color and crisp texture to the surface of microwave-cooked food products which is not pre-cooked before it is applied to food products, comprising an edible substantially water-immiscible liquid having dispersed therein a coagulant, in an amount effective to retard spattering of the composition during microwave cooking, and a carbohydrate browning agent together with an amount of a crisping agent, which does not substantially absorb the water-immiscible liquid, in an amount effective to impart organoleptically perceptible crispness to the surface of a food which has been coated with said composition and cooked with microwave radiation, wherein the water-immiscible liquid is present in an amount which is effective to completely surround the crisping agent when the food coating composition is coated onto the surface of foods.

13. The composition according to claim 12 wherein said crisping agent comprises a foodstuff which is grindable and exhibits crispness when substantially dehydrated.

14. The composition according to claim 12 wherein said crisping agent comprises cornflakes or bread crumbs.

15. The composition according to claim 12 wherein said composition further comprises flavorings and seasonings.

16. The composition according to claim 12 wherein said browning agent comprises fructose.

17. The composition according to claim 12 wherein said browning agent comprises a maltodextrin.

18. The composition according to claim 12 wherein said coagulant is egg white powder.

19. The composition according to claim 12 wherein said substantially water-immiscible liquid comprises an animal or vegetable oil or fat.

20. The composition according to claim 12 wherein the substantially water-immiscible liquid comprises a fluid selected from the group consisting of margarine, butter, shortening, cottonseed oil, palm oil, sesame seed oil, sunflower seed oil and fish oil.

21. The composition according to claim 12 wherein the composition comprises, by weight, about 30% to about 50% of said liquid, about 10% to about 25% of said coagulant, and about 20% to about 50% of said crisping agent.

22. The composition according to claim 12 wherein the composition comprises about 3% to about 8% by weight of said browning agent.

23. The composition according to claim 22 wherein said liquid comprises animal or vegetable oil; said coagulant comprises egg white or egg white powder; said browning agent comprises a carbohydrate; and said crisping agent comprises a foodstuff which exhibits grindability and crispness when substantially dehydrated.

24. A method for imparting brown color and crisp texture to the surface of a microwave-cookable food product comprising:
(a) contacting the surface of the food product with an effective amount of a food coating composition which has not been pre-cooked comprising an edible substantially water-immiscible liquid having therein an amount of a coagulant effective to retard spattering of the composition during microwave cooking and a crisping agent, which does not substantially absorb the water-immiscible liquid, in an amount effective to impart organoleptically perceptible crispness to the surfaces of foods which have been coated with said composition and cooked with microwave radiation, wherein the water immiscible liquid is present in an amount which is effective to completely surround the crisping agent when the food-coating composition is coated onto the surface of foods; and
(b) subjecting said food product to microwave radiation.

25. The method according to claim 24 wherein said crisping agent comprises a foodstuff which is grindable and exhibits crispness when substantially dehydrated.

26. The method according to claim 24 wherein said crisping agent comprises cornflakes or bread crumbs.

27. The method according to claim 24 wherein said food coating composition further comprises a browning agent in an amount which is effective to impart a brown color to the surface of foods which have been coated with said composition and cooked with microwave radiation.

28. The method according to claim 27 wherein said browning agent comprises a carbohydrate.

29. The method according to claim 27 wherein said browning agent comprises a maltodextrin.

30. The method according to claim 24 wherein said coagulant is egg white or egg white powder.

31. The method according to claim 24 wherein said substantially water-immiscible liquid comprises an animal or vegetable oil or fat.

32. The method according to claim 24 wherein said substantially water-immiscible liquid comprises a fluid selected from the group consisting of margarine, butter, shortening, cottonseed oil, palm oil, sesame seed oil, sunflower seed oil and fish oil.

33. The method according to claim 24 wherein said food coating composition comprises, by weight, about 30% to about 80% by weight of said liquid; about 10% to about 25% by weight of said coagulant; and about 20% to about 50% by weight of said crisping agent.

34. The method according to claim 27 wherein said food coating composition comprises from about 3% to about 8% by weight of said browning agent.

35. The method according to claim 34 wherein said liquid comprises animal or vegetable oil; said coagulant comprises egg white or egg white powder; said browning agent comprises a carbohydrate; and said crisping agent is a foodstuff which is grindable and exhibits crispness when substantially dehydrated.

36. The composition according to claim 1 wherein said liquid comprises a mixture of oil and shortening in a ratio of oil to shortening of about 3:1 to about 5:1.

* * * * *